(12) United States Patent
Torset et al.

(10) Patent No.: US 9,160,824 B2
(45) Date of Patent: Oct. 13, 2015

(54) COVER FOR PORTABLE DEVICES ADAPTED TO ATTACH MODULES THERETO

(75) Inventors: Arvid Torset, Ulset (NO); Stein Gausereide, Bergen (NO); Morten Hansen, Fyllingsdalen (NO); Arild Stokke, Sandsli (NO)

(73) Assignee: MOBILICER AS, Hordvik (NO)

( * ) Notice: Subject to any disclaimer, the term of this patent is extended or adjusted under 35 U.S.C. 154(b) by 41 days.

(21) Appl. No.: 14/112,652

(22) PCT Filed: Apr. 18, 2012

(86) PCT No.: PCT/GB2012/050848
§ 371 (c)(1),
(2), (4) Date: Nov. 13, 2013

(87) PCT Pub. No.: WO2012/143711
PCT Pub. Date: Oct. 26, 2012

(65) Prior Publication Data
US 2014/0080553 A1    Mar. 20, 2014

(30) Foreign Application Priority Data

Apr. 18, 2011 (NO) .................................... 20110611
Jan. 9, 2012 (GB) .................................... 1200268.9

(51) Int. Cl.
*H04M 1/00* (2006.01)
*H04M 1/02* (2006.01)
(Continued)

(52) U.S. Cl.
CPC ........... *H04M 1/0258* (2013.01); *G06F 1/1632* (2013.01); *H04M 1/0256* (2013.01); *H04M 1/04* (2013.01); *H04M 1/72575* (2013.01); *H04R 1/10* (2013.01); *G06F 2200/1633* (2013.01)

(58) Field of Classification Search
CPC . H04M 1/0262; H04M 1/7253; H04W 4/008; H04W 52/0296
USPC .......................... 455/90.3, 575.1, 575.8, 575.7
See application file for complete search history.

(56) References Cited

U.S. PATENT DOCUMENTS 5,848,904 A * 12/1998 Kikuchi .................... 439/136
7,612,997 B1 * 11/2009 Diebel et al. ............. 361/679.56
(Continued)

FOREIGN PATENT DOCUMENTS

| EP | 2059005 A2 | 5/2009 |
| GB | 2455771 A | 6/2009 |
| WO | 2009024925 A2 | 2/2009 |

OTHER PUBLICATIONS

International Search Report for PCT/GB2012/050848, filed Apr. 18, 2012, received Sep. 19, 2012.
(Continued)

*Primary Examiner* — Sonny Trinh
(74) *Attorney, Agent, or Firm* — Carter, DeLuca, Farrell & Schmidt, LLP

(57) ABSTRACT

A cover, for use with a mobile telephone, is adapted at least partially to cover the mobile telephone when the telephone is installed within the cover while allowing user access to the mobile telephone. The cover is adapted to receive in a detachable manner one or more accessories for use with the mobile telephone. The one or more accessories may include one or more sensors for providing in operation one or more corresponding transduced signals to the mobile telephone and are operable to receive their power provided from the cover.

18 Claims, 9 Drawing Sheets

(51) Int. Cl.
  *G06F 1/16*   (2006.01)
  *H04M 1/04*   (2006.01)
  *H04M 1/725*  (2006.01)
  *H04R 1/10*   (2006.01)

(56) References Cited

U.S. PATENT DOCUMENTS

| | | | |
|---|---|---|---|
| 8,150,485 B2* | 4/2012 | Lee | 455/575.7 |
| 2002/0090981 A1 | 7/2002 | Bae | |
| 2004/0198470 A1* | 10/2004 | Dyer et al. | 455/575.1 |
| 2010/0093412 A1* | 4/2010 | Serra et al. | 455/575.8 |
| 2010/0177036 A1 | 7/2010 | Nam | |
| 2011/0210018 A1* | 9/2011 | Friedman et al. | 206/5 |
| 2012/0088558 A1* | 4/2012 | Song | 455/575.1 |
| 2014/0073250 A1* | 3/2014 | Singh | 455/41.2 |

OTHER PUBLICATIONS

International Preliminary Report on Patentability, International Patent Application No. PCT/GB2012/050848, filed Oct. 18, 2013 (10 pages).

International Preliminary Report on Patentability, International Patent Application No. PCT/GB2012/051330, filed Dec. 24, 2013 (5 pages).

* cited by examiner

COVER FOR PORTABLE DEVICES ADAPTED TO ATTACH MODULES THERETO

CROSS-REFERENCE TO RELATED APPLICATIONS

This application is a U.S. National-Stage entry under 35 U.S.C §371 based on International Application No. PCT/GB2012/050848 filed Apr. 18, 2012, which was published under PCT Article 21(2) and which claims priority to British Patent Application No. 1200268.9 filed Jan. 9, 2012, which claims priority to Norwegian Patent Application No. 20110611 filed on Apr. 18, 2011.

FIELD OF THE INVENTION

The present invention relates to accessories for mobile telephones and other portable electronic devices. Moreover, the present invention also concerns methods of using such accessories with mobile telephones and other portable devices. Furthermore, the present invention also relates to software products recorded on machine readable media, wherein the software products are executable on computing hardware for implementing aforementioned methods.

BACKGROUND OF THE INVENTION

Mobile telephones, also known as "cell phones" in certain parts of the World on account of wireless communication being achieved via spatial wireless zones or "cells" served by mobile telephone telecommunications infrastructure, have become generally used by people. Increasingly, mobile telephones are not only being used as devices for text and oral communication, but also as diaries and data storage. Thus, contemporary people by habit usually have their mobile telephones with them wherever they travel and work. In order to improve the usefulness of mobile telephones, various manufacturers have tried to improve mobile telephone functionality, for example by including optical sensors on the mobile telephones so that they are also able to function as cameras. However, a problem arises that people expect their mobile telephones to be relatively compact, thereby representing a limit to how many different types of sensors and other facilities can be integrated into a mobile telephone.

In a Japanese patent application no. JP06244924A ("Multifunction telephone set"; inventor Takazawa Yasumasa; applicant Fuji Facom Corp.), there is described a multi-function telephone set operable to provide a burglar-proof function, for notifying regarding illegal invasion during absence, and also a fire prevention function, for notifying of occurrence of fire during absence. In addition, the telephone set is operable to provide automatic message recording functions. Optionally, the multi-function telephone set includes infrared sensors, smoke sensors and a microphone which are used for fire detection and burglar detection. A problem with such a multifunction telephone set is that its additional sensors render the mobile telephone more complex and bulky. Not all users necessary, out of choice, are desirous to have both burglar and fire detection.

In a European patent application no. 1959655A1 ("Radio accessory for a mobile device", applicant Research in Motion Ltd.), there is described a mobile device including a radio subsystem, a user interface, a short range communication system, and a battery adapted to power the mobile device. Moreover, there is also described an accessory adapted to communicate with the mobile device, wherein the accessory includes at least one processor, and short range communication system adapted to communicate with the short range communication system of the mobile device. The radio subsystem of the mobile device differs from the radio subsystem of the accessory. In the patent application, the accessory is illustrated coupled to transducers.

It has been found in practice that few users are desirous to have a multi-function mobile telephone as proposed by Fuji Facom Corp., and the accessory proposed by Research in Motion Ltd., for reasons believed to relate to inconvenience of numerous accessories to take care of, and overcomplicated use of multifunctions.

SUMMARY OF THE INVENTION

The present invention seeks to provide multi-functionality associated with additional types of sensors, which may include wireless-coupled accessories, for mobile telephones and other portable electronic devices without creating inconvenience as elucidated in the foregoing.

According to a first aspect of the present invention, there is provided a protective cover for use with a portable electronic device, the cover being adapted at least partially to cover the electronic device when the electronic device is installed therein whilst allowing user access to the device, the cover being further adapted to receive in a detachable manner one or more powered accessories which is/are able to receive power provided from the cover.

The invention is of advantage in that the one or more accessories may be conveniently retained by the cover when not deployed and can also receive their power from it, thereby rendering the cover practical and functional for its user. In particular it means that an accessory can still be used even when its own power is unavailable (e.g. because the accessory's included battery is depleted) and no power is available from the portable electronic device (e.g. because its included battery is depleted). This is important where the accessory performs a safety function. Typically the accessory will comprise a rechargeable battery that may be charged by the cover, but that is not necessarily essential. It is envisaged for example that the accessory could, depending on the application, be powered by a solar cell of through inductive coupling with the cover.

In a set of embodiments the accessory comprises a wireless interface for communicating with the cover and/or the portable electronic device when detached from the cover.

A large variety of powered accessories may be used with the invention. In one set of embodiments the accessory includes one or more sensors for providing, in operation, one or more corresponding transduced signals to the portable electronic device. For example the accessory could comprise: an ear-piece with associated microphone for "hands free" telephonic communication, smoke detector, an intruder detector, a temperature sensor, a baby monitor, a rape alarm, an avalanche victim location device, a crime alarm, a special assistance alarm (for example elderly people) etc. In a set of embodiments the accessory is adapted to execute near field communication (NFC) with infrastructure items, for example hotel doors, payment stations, access computers and so forth.

However, the present invention is not limited to these examples. Indeed it is not essential for the accessory to send signals to the portable electronic device. For example the accessory could simply receive signals from the portable device—as in the case of a simple ear-piece for listening to sounds. The accessory may not communicate with the portable electronic device at all—e.g. in the case of a torch or laser pointer.

In a set of embodiments the accessory comprises a user interface which permits a user to control a function of the portable electronic device.

In a preferred set of embodiments the cover includes energy storage means, e.g. a rechargeable battery, for storing energy for the accessory. This is not essential however, for example the cover could provide power to the accessory only when it is itself powered from another source e.g. a mains charger or USB connection, or the cover could comprise means for generating its own power—e.g. a solar cell as set out below, or a manually operated inductor (wind-up power).

In a set of embodiments the cover includes a solar cell arrangement. This could be provided in addition to and for recharging the rechargeable battery or it may be provided instead of a rechargeable battery. Either way it may provide power to the accessory and/or for recharging the portable electronic device.

Optionally the cover is arranged so that the accessory received thereby is charged when the portable electronic device is charged.

In a set of embodiments the cover includes a power input arrangement for receiving power in operation, and a connector arrangement for providing power from the cover to the portable electronic device when installed within the cover. In a set of such embodiments the power input arrangement is operable to receive a mutually similar connector to that presented by the cover to the portable electronic device.

Optionally the cover is adapted to receive the one or more accessories by one of more of: flexible clip-in mechanical coupling, magnetic coupling, micro-projection mutual engagement coupling, mechanical translation-type coupling, pivotal coupling.

Optionally the accessory is operable to be attached to a user's body.

In a set of embodiments the accessory is received at a peripheral edge of the cover. This enables the profile of the cover to be kept relatively low. The Applicant has devised a particularly beneficial form of ear-piece for such an arrangement but which is also novel and advantageous in its own right.

When viewed from a second aspect the invention provides a wireless ear-piece device adapted to communicate wirelessly with an electronic device and comprising a first elongate part including a loudspeaker and a second elongate part optionally including a microphone, the first and second elongate parts being manually configurable into: a stowage configuration in which they are substantially longitudinally adjacent along a common axis to permit stowage on a carrier means; and an operative configuration in which the first and second elongate parts are arranged such as to define a mutual included axis between their respective longitudinal axes of between 20 and 170 degrees so that the first elongate part may be received in or on a user's ear.

The ear-piece set out above may be the accessory or one of the accessories used in accordance with any of the other aspects of the invention.

In a set of preferred embodiments the portable electronic device comprises a mobile telephone, e.g. a smartphone. However this is not essential—it could for example comprise a personal digital assistant, hand-held GPS device, tablet or pocket computer etc.

The invention extends to a cover having the portable electronic device installed therein.

When viewed from a third aspect the invention provides a cover for use with a mobile telephone, characterized in that the cover is adapted at least partially to cover the mobile telephone when the telephone is installed within the cover whilst allowing user access to the mobile telephone, and the cover is adapted to receive in a detachable manner one or more accessories for use with the mobile telephone, and wherein the one or more accessories include one or more sensors for providing in operation one or more corresponding transduced signals to the mobile telephone and are operable to receive their power provided from the cover.

According to fourth aspect of the invention, there is provided a method of using a cover pursuant to the first or third aspect of the invention, characterized in that the method includes:

(a) detaching one or more accessories from their respective one or more positions on the cover;

(b) arranging for the one or more accessories at one or more respective locations spatially remote from the cover; and (c) arranging for the one or more accessories to transduce one or more environmental parameters and communicate one or more corresponding signals to the cover and/or the mobile telephone or other portable electronic device.

According to a fifth aspect of the invention, there is provided a software product recorded on a machine-readable data storage medium, characterized in that said software product is executable upon computing hardware of a mobile telephone or other portable electronic device for implementing the method pursuant to the fourth aspect of the invention.

It will be appreciated that one of the advantages of embodiments the invention as set out hereinabove is that the cover can be retro-fitted to existing devices. However many of the other advantages of the invention may be achieved by providing the features of the cover in integrally with the device. Thus according to a sixth aspect of the invention there is provided a portable electronic device having a protective housing, the housing being adapted to receive in a detachable manner at least one powered accessory which is able to receive power provided from the housing.

The preferred and optional features of the cover as set out herein are also considered preferred and optional features of the aforementioned housing.

It will be appreciated that features of the invention are susceptible to being combined in various combinations without departing from the scope of the invention as defined by the appended claims.

DESCRIPTION OF THE DIAGRAMS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

Figure 1:
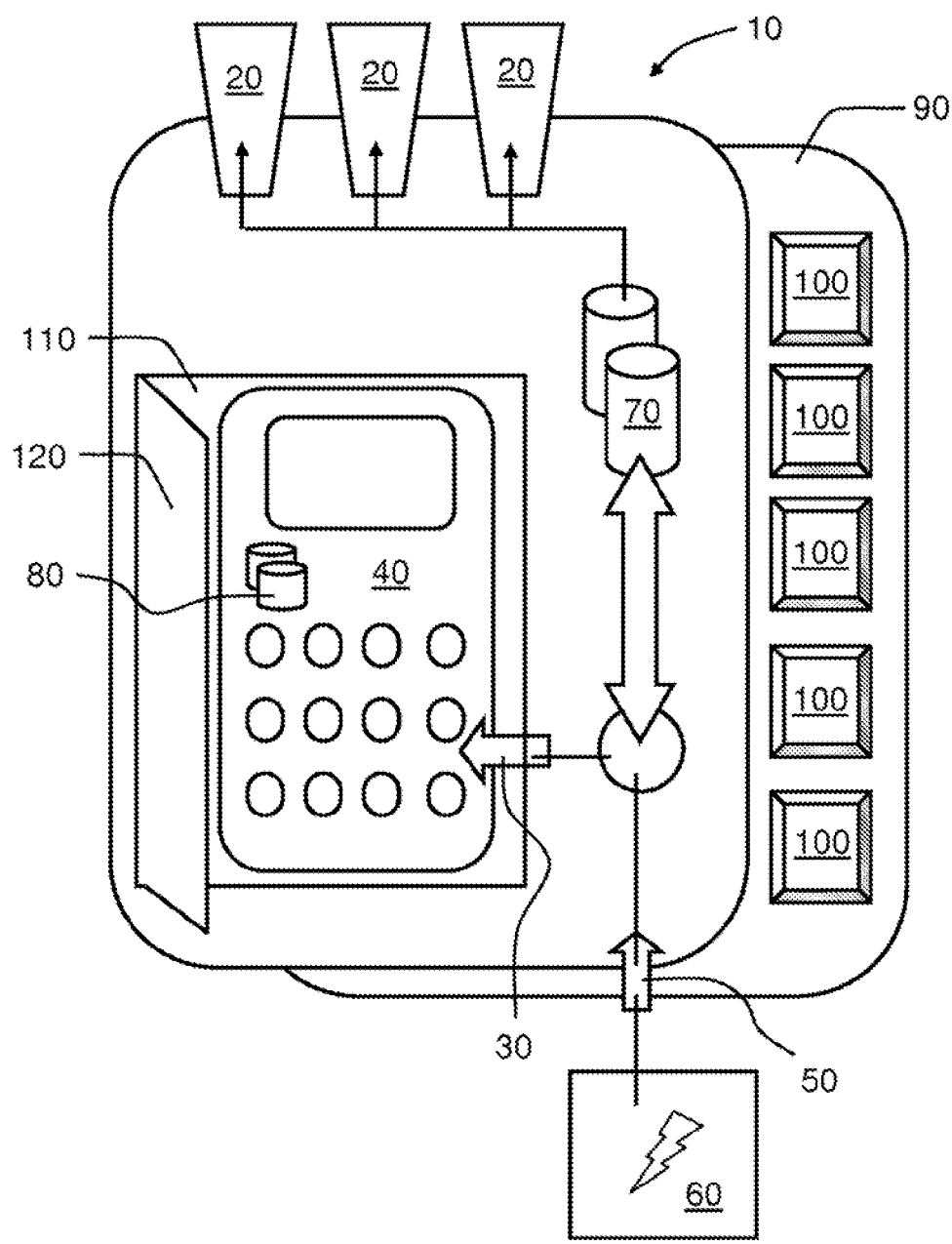
FIG. 1 is a schematic illustration of a cover for a mobile telephone, embodying to the present invention.

Illustrated schematically in FIG. 1 is a mobile telephone cover 10 which includes one or more inbuilt various detachable accessories 20. The mobile telephone cover 10 includes an internal plug 30 for coupling to a mobile telephone 40 when installed within the cover 10, and an external socket for receiving a charger plug 50 from a charger 60; optionally, the internal plug 30 and the charger plug 50 are mutually similar, such that the cover 10 is purchased as an accessory for the mobile telephone 40 without its user needing to purchase a replacement for the charger 60. Moreover, the mobile telephone cover 10 includes a battery 70 for providing power for recharging and/or powering the one or more detachable accessories 20 as well as providing emergency power to the mobile telephone 40 in an event a battery 80 within the mobile telephone 40 becomes discharged and yet its user wishes to make a telephone call, for example in an emergency situation. Optionally, the cover 10 includes on its rear surface 90 a solar cell array 100 for charging one or more of the batteries 70, 80; optionally, the solar cell array 100 includes one or more silicon-based solar cells or one or more metallic nano-particle-based solar cells. A front region, indicated by 110, of the cover 10 is left open to enable user access to the mobile telephone 40 when installed within the cover 10. Optionally, the front region 110 is provided with a cover flap or lid 120 for protecting the mobile telephone 40 when not being viewed by its user; the lid or flap 120 is optionally at least one of: detachable, slidable, pivotable or foldable to enable the user to access a screen and/or keyboard the mobile telephone 40.

Figure 2:
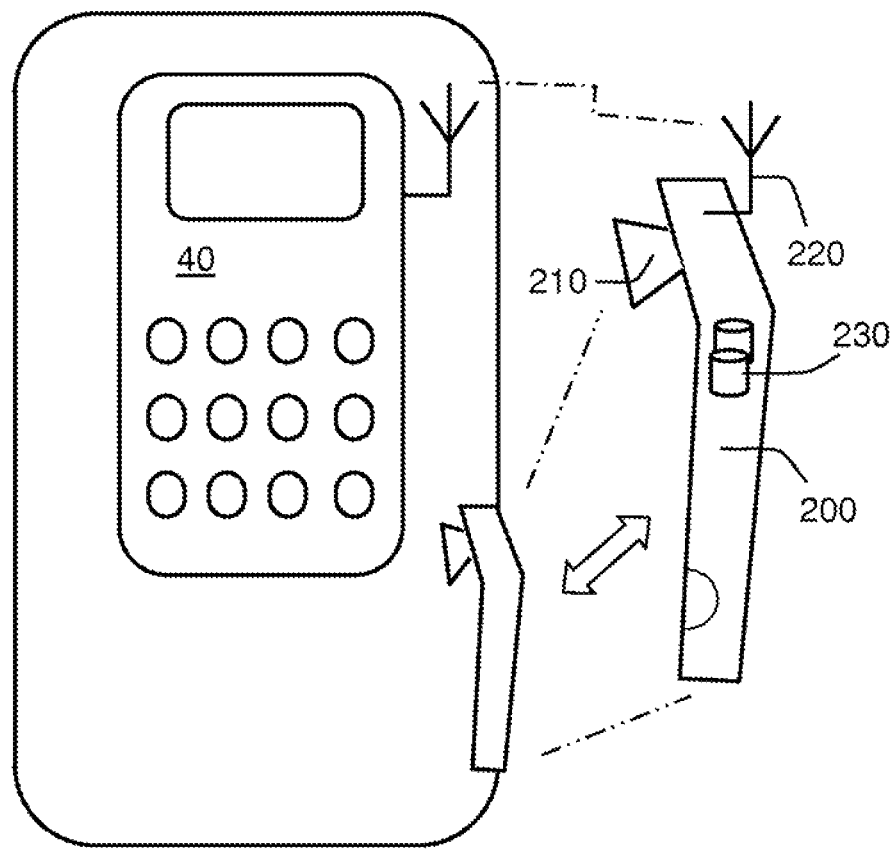
FIG. 2 is an illustration of an ear-piece accessory for the cover of FIG. 1.

The accessories 20 optionally include one or more of the following types. These are merely a few, non-exhaustive examples. The first type of accessory is a wireless ear-piece 200 which the user is able to clip and unclip from the cover 10. The ear-piece 200 beneficially has one of more mechanical elements 210 which are optionally deployable, for example by folding out into a deployed state and folded back into a non-deployed state, for enabling the ear-piece 200 to be comfortably and reliably retained on the user's ear flap. This is shown in greater detail in FIG. 9. The user is able to attach the ear-piece to his/her ear in use; optionally, as illustrated in FIG. 2, a proprietary BlueTooth or similar near-field communication interface 220 is provided in operation between the ear-piece 200 and the mobile telephone 40. The ear-piece 200 optionally includes a rechargeable battery 230 which is recharged when the ear-piece 200 is clipped onto the cover 10 for retention thereby, for example at a peripheral edge thereof. The ear-piece 200 enables the mobile telephone 40 function in a "hands-free" manner which is very important when driving vehicles to satisfy legal requirements and ensure safe vehicle driving; optionally, the ear-piece 200 is operable, for example, in response to user activation of a button on the ear-piece 200, to activate its associated mobile telephone 40 associated with the cover 10.

Figure 3:
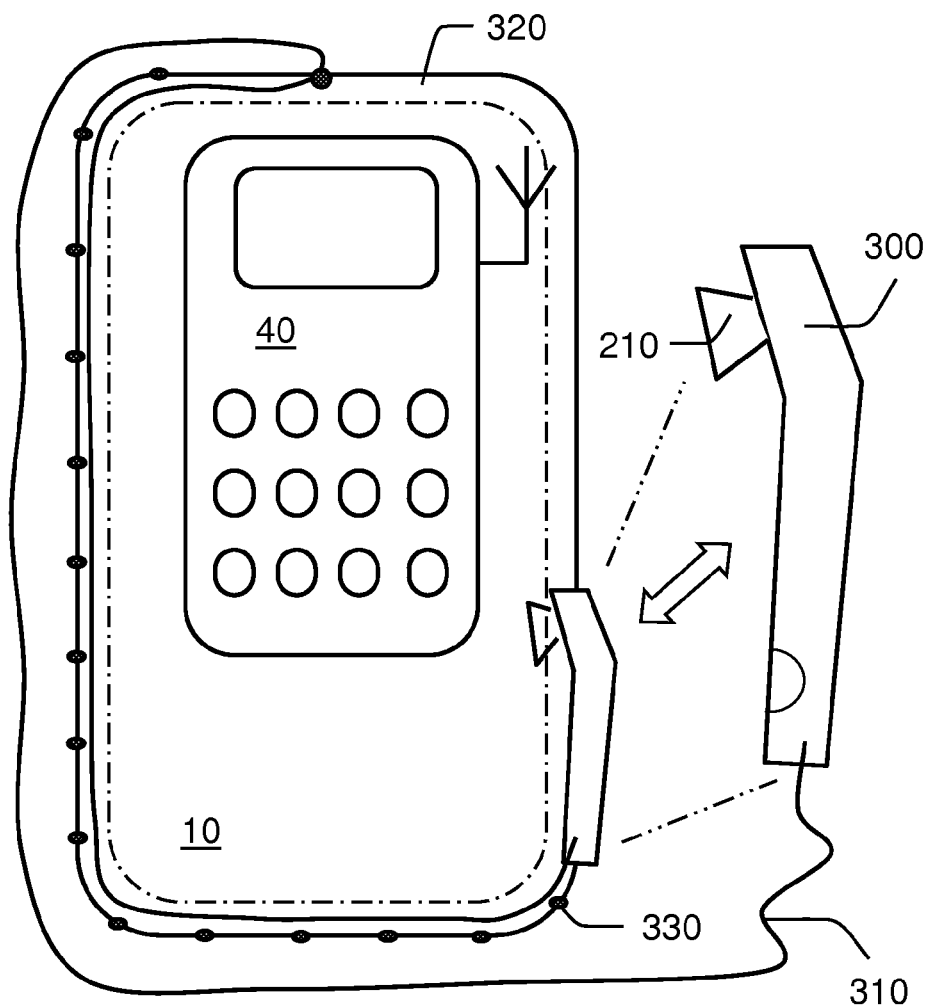
FIG. 3 is an illustration of a wire-coupled ear-piece for use with the cover of FIG. 1.

The second exemplary type of accessory is a wire-coupled ear-piece 300 as illustrated in FIG. 3 which the user is able to clip and unclip from the cover 10. The user is able to attach the ear-piece 300 to his/her ear in use. Beneficially, the cover 10 is adapted to receive the wire 310 in a compact and reliable manner when the ear-piece is clipped in its retention position onto the cover 10; for example, the cover 10 includes an edge peripheral slot 320 with flexible retention "fingers" 330 for keeping the wire 310 in position within the slot 320 when the ear-piece 300 is not in use.

Figure 4:
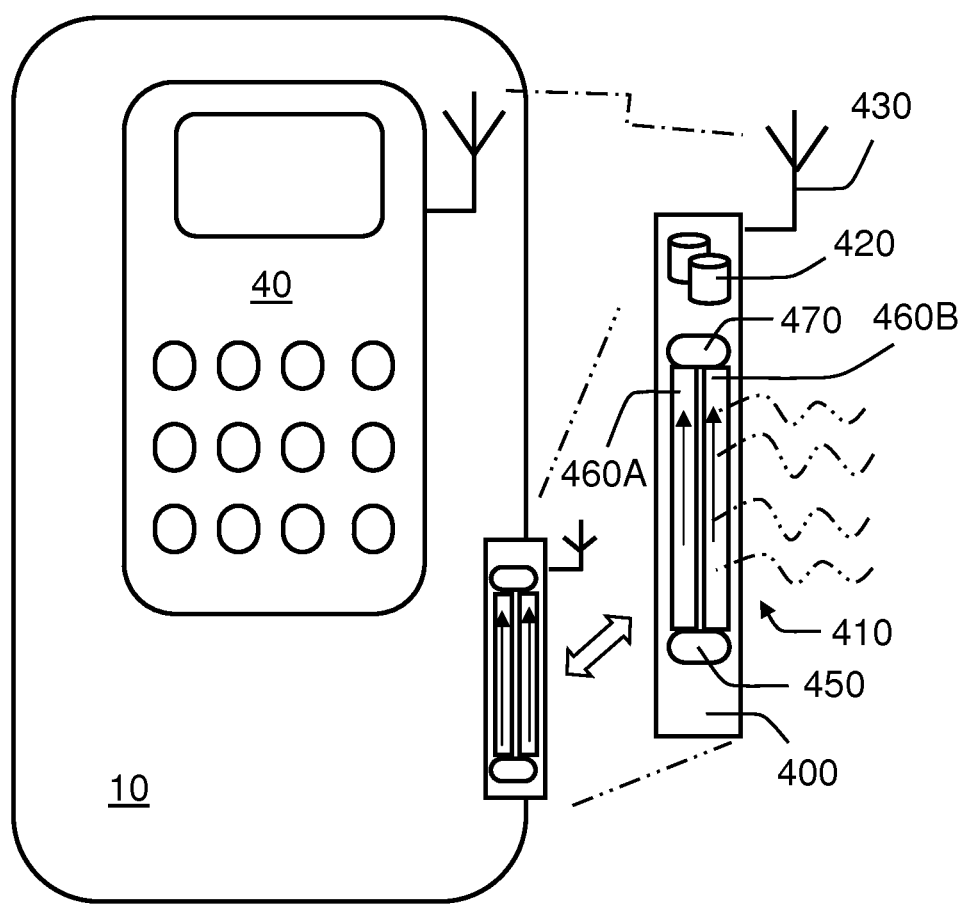
FIG. 4 is an illustration of a smoke-detector accessory for use with the cover of FIG. 1.
Figure 5:
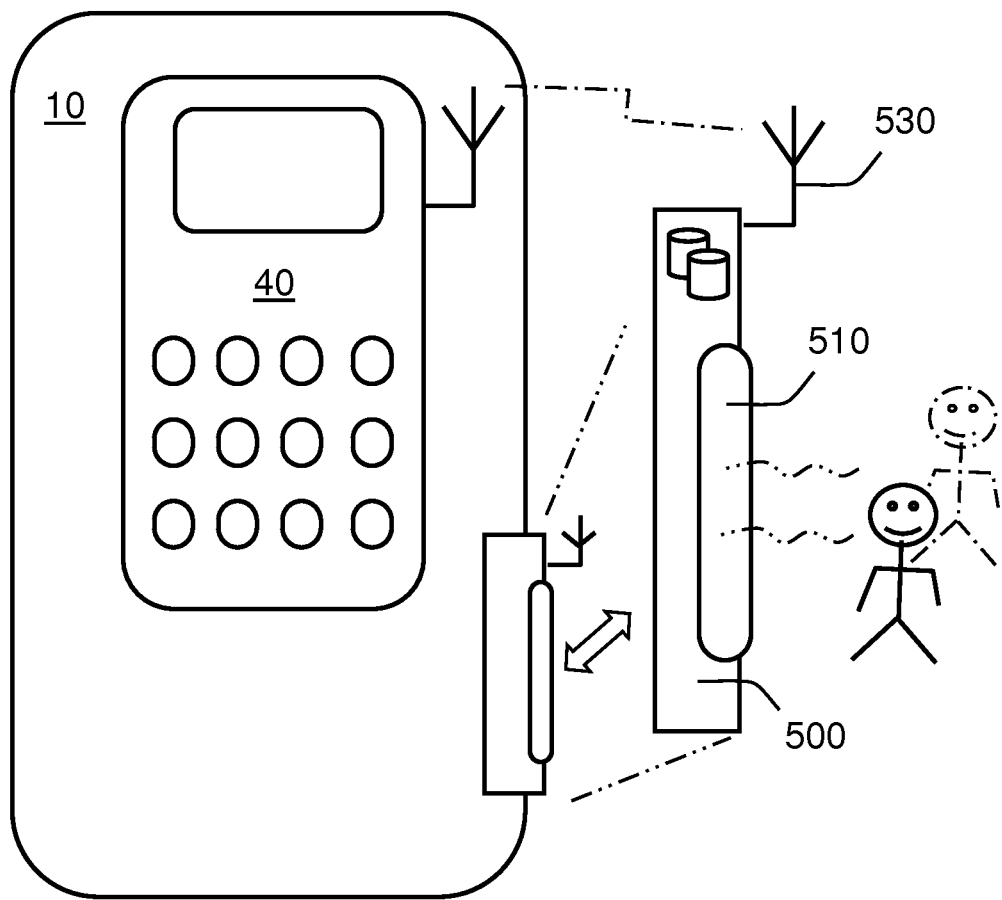
FIG. 5 is a motion detection accessory for use with the cover of FIG. 1.

The third exemplary type of accessory is a smoke-detector 400 as illustrated in FIG. 4 including a smoke detection sensor 410. Optionally, the accessory 400 includes a battery 420, for example a rechargeable battery, and is wirelessly coupled via a wireless interface 430 to the mobile telephone 40, for example via proprietary BlueTooth near-field wireless communication or similar. The smoke detection sensor 410 is beneficially an optical device as illustrated in FIG. 5 including a light source 450, a pair of light paths 460A, 460B, and a light detector 470. The first light path 460A is a control light path which is not vented to ambient air around the accessory 400, whereas the second light path 460B is vented to receive smoke, when present, from the ambient air around the accessory 400. Beneficially, to reduce power consumption, the accessory 400 is operable to energize the light source 450, for example implemented as a light emitting diode, in an intermittent manner.

One of the advantages offered by the embodiments of the invention described herein is that the cover 10 is able to provide power to the accessory even when the internal battery 80 of the mobile telephone is depleted. That is important for accessories like the smoke detector 400 as it allows it to operate and to sound an alarm in the event of smoke being detected even if the mobile telephone 40 is switched off or it's battery is depleted, thereby enhancing the safety of the product.

Figure 6:
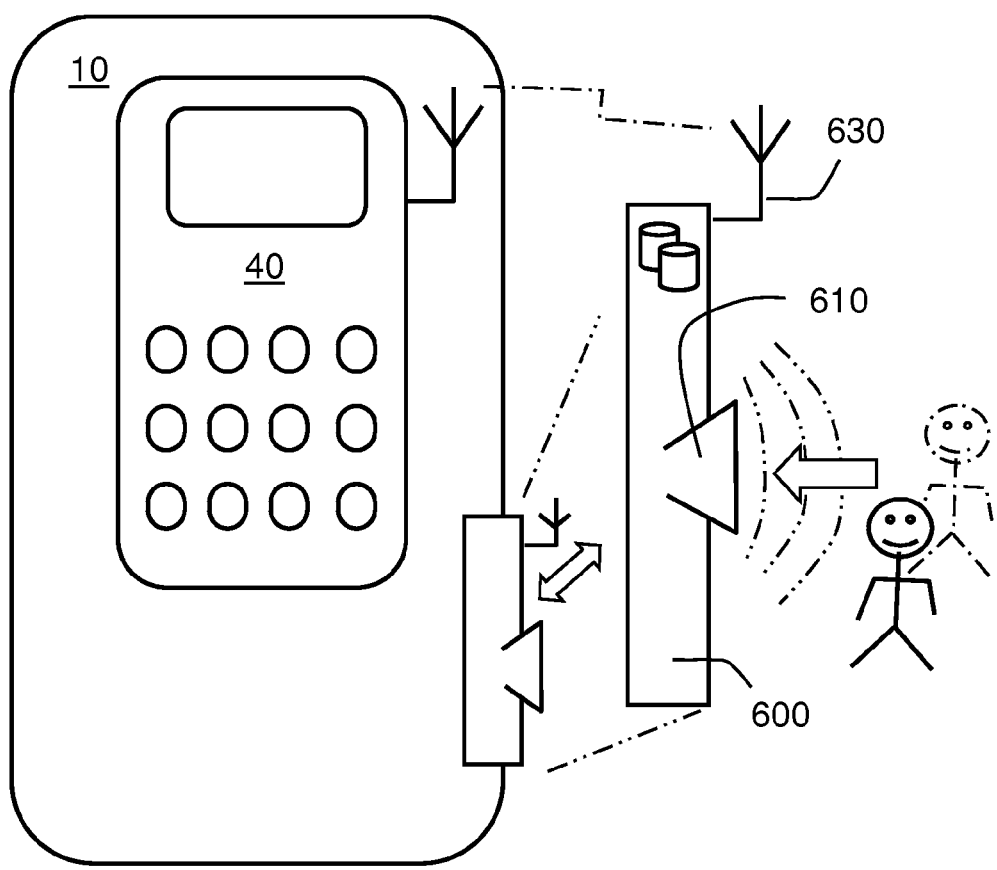
FIG. 6 is an acoustic monitoring accessory for use with the cover of FIG. 1.

The third exemplary type of accessory a motion detection accessory 500 as illustrated in FIG. 5 including a motion detection sensor 510. Optionally, the accessory 500 includes a battery, for example a rechargeable battery, and is wirelessly coupled via a wireless interface 530 to the mobile telephone 40, for example via proprietary BlueTooth near-field wireless communication or similar. The motion detection sensor 500 is beneficially implemented as an Infra-Red sensor and/or an ultrasonic Doppler sensor;

The fourth exemplary type of accessory an acoustic monitoring accessory 600 as illustrated in FIG. 6 including a microphone 610 for monitoring for general environmental sound, for example as a baby monitoring alarm. The microphone 610 is beneficially coupled to a pre-amplifier having automatic gain control (AGC) and/or dynamic frequency filtering to highlight microphone output signals within certain preferred frequency ranges. Optionally, the preferred frequency ranges are settable via a software application executed at the mobile telephone 40. Such AGC and/or dynamic frequency filtering is beneficial for identifying certain types of general environmental sounds. Optionally, the accessory 600 is operable to generate an alarm in an event that the general environmental sound, or a component thereof, falls above, alternatively below, a defined threshold. Optionally, the accessory 600 includes a battery, for example a rechargeable battery, and is wirelessly coupled via a wireless interface 630 to the mobile telephone 40, for example via proprietary BlueTooth near-field wireless communication or similar.

The user employs his/her mobile telephone 40 in a manner as will now be described. The user keeps the mobile telephone 50 with its cover 10 in his/her pocket, briefcase, handbag, rucksack of similar. When the mobile telephone 40 is to be charged, the user leaves the mobile telephone 40 installed in the cover 10 under a power light source or in sunlight to illuminate the solar-cell array 100 and/or plugs the charger 60 into the cover 10 so that power is provided via the cover 10 to charge the mobile telephone 40. The cover 10 is capable of accepting many different types of accessories of mutually similar size; in other words the cover 10 in respect of its accessories 20 can be tailored to the requirements of the user without numerous different versions of the cover 10 needing to be manufactured; for example, some users may desire to have a detachable wireless ear-piece and a motion detector accessory for burglary detection, whereas other users may desire to have two smoke detector accessories.

When driving, the user employs the detachable ear-piece which is in a fully charged state when unclipped from the cover 10 whilst driving an automobile, namely in a "hands-free" manner dictated by legal requirement in many countries. When the user arrives at a destination, for example a home, a summer house or hotel room, the user deploys one or more accessories 20 as required, for example the smoke detector in a wooden summer house where candles are to be burnt or a wood fire lit for warmth where there is a risk that unattended flames could get out of hand and cause a major house fire. The motion sensor can be deployed by the user at a location in the house in a situation where the user is concerned about burglary whilst the user is sleeping; the accessory for motion detection is beneficially placed close to where a burglar is likely to enter, whereas the mobile telephone 40 and its cover 10 are kept in close proximity to the user to provide the user with a warning in an event of a burglary being attempted. As explained above the accessories can be powered from the cover (or optionally their own internal battery) and so are not dependent on receiving power from the mobile telephone itself in order to operate.

Just prior to the user departing from the destination, the user collects the various accessories 20 and clips them back onto the cover 10 from which they are, for example, recharged ready for subsequent use. The cover 10 and its associated accessories thereby enables the user to have necessary sensorial support, namely having a spatially extended sensorium, when operating in various locations. The cover 10 is a considerable improvement on known arrangements for one or more of the following reasons:
(a) for known mobile telephones, their wireless ear-pieces are easily mislaid or lost in pockets, trodden upon and so forth; in the case of the present invention, the ear-piece 200 is reliably retained on the cover 200 when not it use;
(b) the cover 10 can be retrofitted to the mobile telephone 40 without the user needing to buy a new charger 60; and
(c) the cover allows easy access to safety accessories so that they are available to use at all times which will encourage users to use them regularly.

Optionally, the cover 10 is provided with a text and/or symbol area on an external surface thereof for including advertisement logos or other form of identification. Moreover, the cover 10 is beneficially fabricated from a flexible material, for example silicone rubber or polyurethane, for ensuring its robustness and also for providing shock protection for the mobile telephone 40. Electrical components included within the cover 10 are beneficially encapsulated, for example moulded, in the material of the cover 10. Beneficially, the accessories 20 are encapsulated in a similar material and in a similar manner to the cover 10. Optionally, the encapsulations for the accessories 20 are of mutually similar dimensions so that they can be mixed and matched for use with the cover 10 depending upon user requirements.

Figure 7:
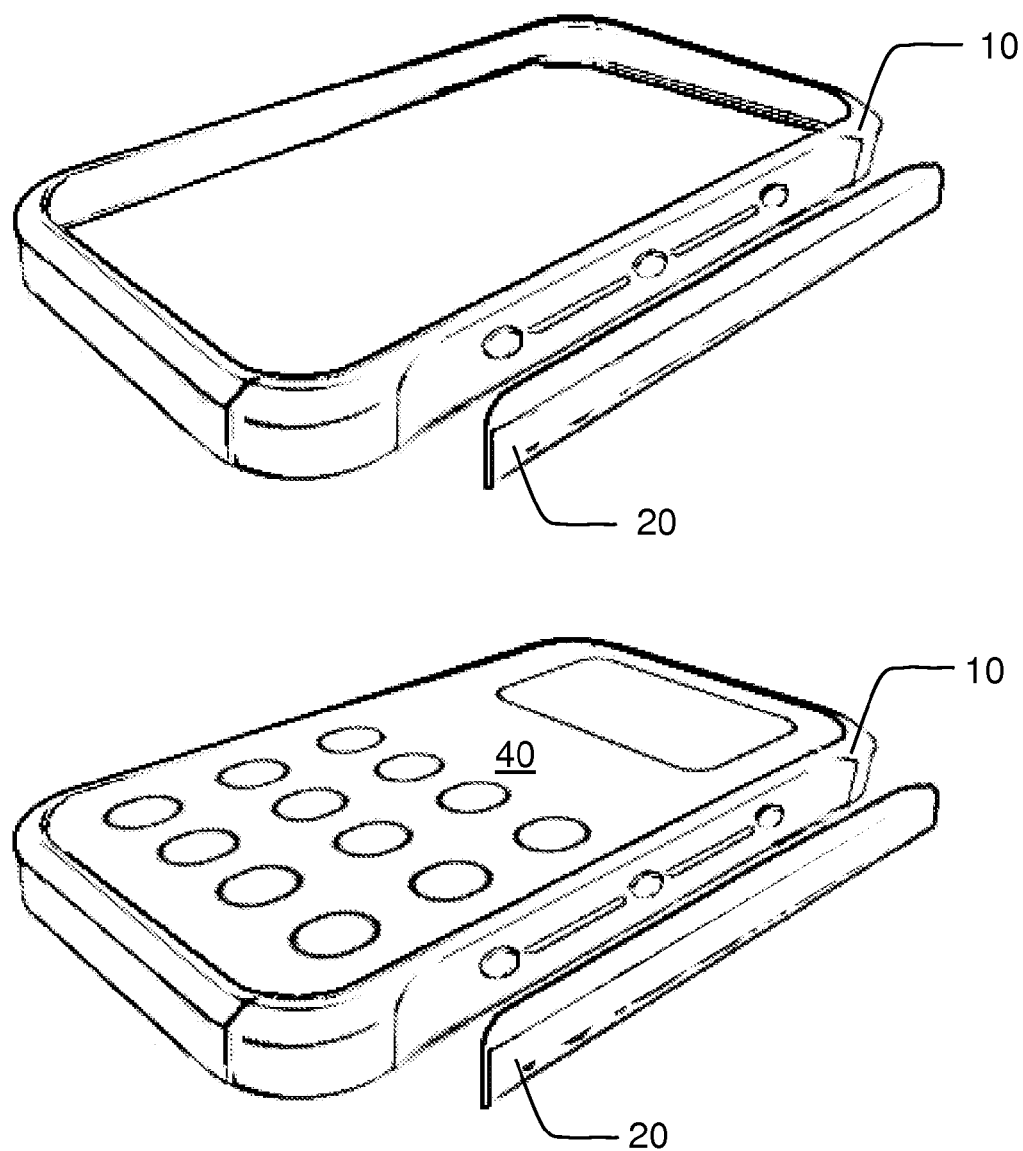
FIG. 7 is a perspective view of an example embodiment of the cover illustrated in FIG. 1.

In FIG. 7, there is shown an example implementation of the cover 10 wherein the accessory 20 is operable to be detached and attached along a side peripheral edge of the cover 10, wherein the cover 10 is provided with a recess for receiving the accessory 20. The mobile telephone 40 is shown in one of the illustrations of FIG. 7 installed into its associated cover 10. A detachable accessory 20 is shown which is illustrated to be attachable to the cover 10 by way of one or more permanent magnets. The accessory 20 is designed, in terms of its external profile, to fit into a peripheral a side externally-facing peripheral region of the cover 10, such that the cover 10 and its associated accessory 20 when coupled together present a substantially spatially smoothly changing external surface. The accessory 20 illustrated in FIG. 7 is beneficially at least one of: a wireless earpiece for "hands-free" operation, a temperature sensor, a smoke detector, an environmental sound monitor detector, a motion detector, a water leak detector, a pyrometric fire detector, a light detector, a camera unit, although this list is not exhaustive.

Mechanical location of accessories 20 into the cover 10 is beneficially achieved by one or more of the following coupling techniques:
(i) by permanent magnet attractive retention;
(ii) by mechanical flexible clipping-like retention;
(iii) by pivotal rotational engagement, for example a projection at a first elongate end of the accessory 20 fits into a recess of the cover 10, whereas a second elongate end of the accessory 20 is retained onto the cover 10 by magnetic and/or clipping-like retention;
(iv) by Velcro-strip™ or similar type of mechanical mutually engaging microprojection interlocking arrangement;
(v) by mechanical sliding engagement; and
(vi) by a mechanical button or lever on the accessory 20 for inserting a power input arrangement into the cover 10, wherein the mechanical button is also employed for controlling attachment and/or detachment of the accessory 20 to the cover 10.

Optionally, the cover 10 includes a resonant coil antenna for receiving an alternating magnetic field for charging the battery 70. Such an implementation enables the cover 10 and its charger 60 to be implemented in a non-contact manner which renders the cover 10 even easier for users to employ. The resonant coil antenna is beneficially implemented as an encapsulated component within a material of the cover 10.

Figure 8:
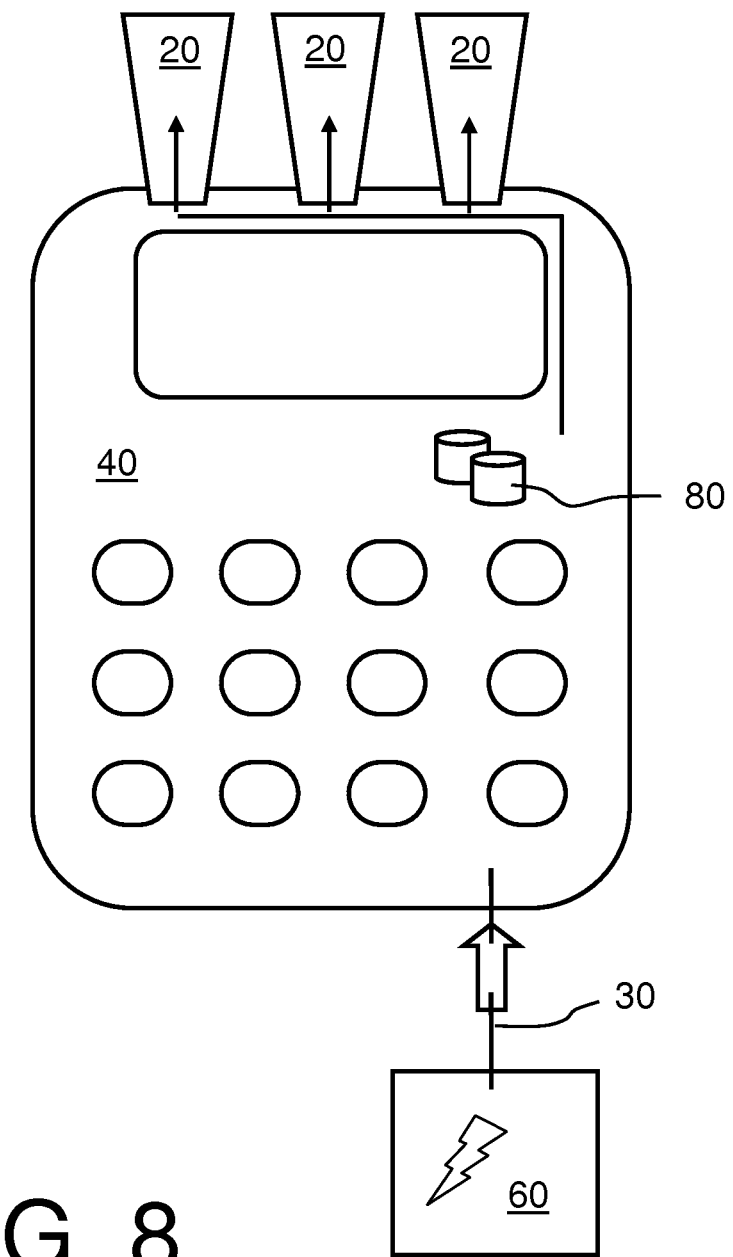
FIG. 8 is an illustration of a mobile telephone adapted to receive one or more accessories in a detachable manner so that users are inclined to carry their mobile telephone with accessories as a single convenient entity.

Referring next to FIG. 8, there is shown schematically an arrangement in which instead of a separate cover into which the mobile telephone 40 is installed, it is provided with an integral housing which has similar features—i.e. the housing has a facility for detachably receiving one or more accessories 20 as aforementioned which receive power from the housing (as opposed to from the main battery of the device). One of the accessories 20 in FIG. 8 is optionally a reserve emergency battery 60 for the telephone 40 in an event that its internal rechargeable battery becomes unexpectedly depleted of stored energy therein. In FIG. 8, the one or more accessories 20 beneficially arranged so that, when attached in position on the mobile telephone 40, they provide an attractive smoothly-contoured form to the telephone 40. Optionally, the mobile telephone 40 is provided with pivotal lids or flexible flaps which protect positions for receiving the accessories 20, when the accessories 20 are not attached to the telephone 40. Optionally, the mobile telephone 40 illustrated in FIG. 8 is also provided with a cover 10 as described with reference to the previous Figures so that the mobile telephone 40 is then equipped with two tiers of potential accessories 20, depending upon user requirements; such an arrangement for the mobile telephone 40 provides the user with an especially flexible mobile telephone configuration suitable for being adapted to changing circumstances.

Figure 9:
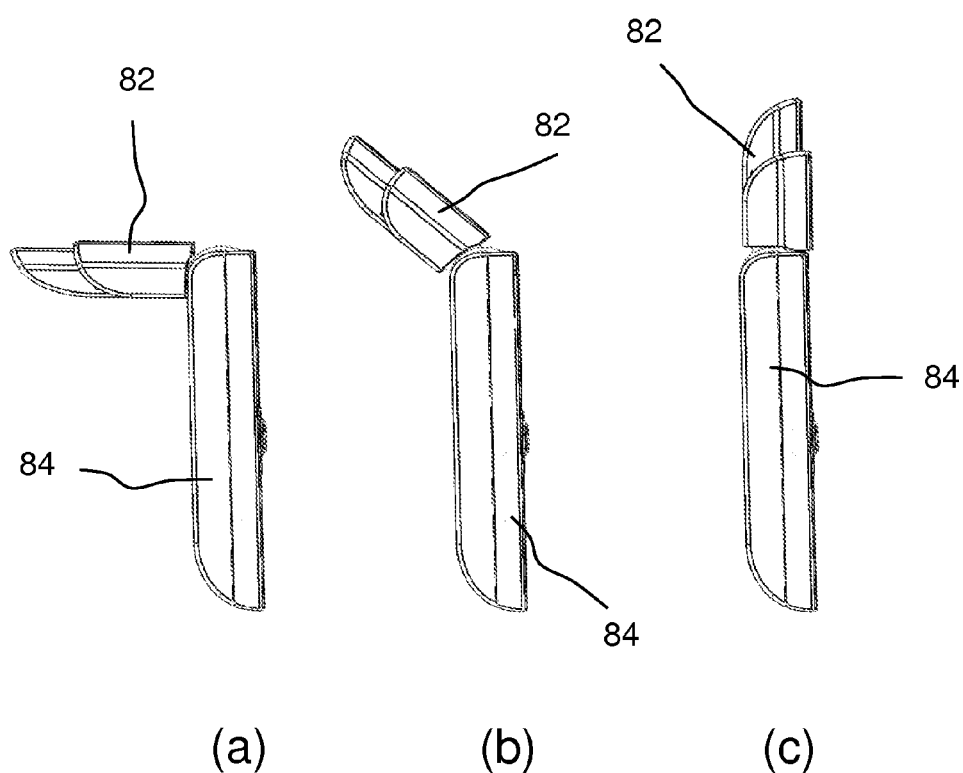
FIGS. 9a-c are views of an ear-piece which can be configured in a operative or stowage position.

FIG. 9 shows in more detail a wireless ear-piece which may be used as an accessory in accordance with the cover or housing of the invention as previously described or may be used in other applications. It comprises two parts: an upper part 82 which contains a loudspeaker (not shown) and a lower part 84 which contains a microphone (also not shown). In FIG. 9(*a*) the ear-piece is shown in an operative configuration in which a user can insert the upper part 82 into his or her ear—e.g. for making calls via the mobile telephone. When the user has finished using it the upper part 82 may be pivoted up until it is in line with the lower part 84—see FIGS. 9(*b*) and 9(*c*). The ear-piece can then conveniently be stowed—e.g. at the peripheral edge of the cover 10 shown in the other Figures. The ear-piece preferably communicates wirelessly with a mobile telephone, e.g. using Bluetooth (Registered Trade Mark) as is well known per se in the art.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A protective arrangement for use with a portable electronic device, the protective arrangement comprising:
   a cover adapted at least partially to cover the portable electronic device when the portable electronic device is installed therein while allowing user access to the portable electronic device, the cover being further adapted to receive in a detachable manner at least one accessory which is able to receive power provided from the cover,
   wherein the at least one accessory transduces one or more environmental parameters and communicates one or more corresponding signals to the cover and/or the portable electronic device.

2. The protective arrangement as claimed in claim 1, wherein the at least one accessory includes one or more sensors for transducing the one or more environmental parameters and communicating the one or more corresponding signals to the portable electronic device.

3. The protective arrangement as claimed in claim 1, further comprising energy storage means for storing energy for the at least one accessory and/or the portable electronic device.

4. The protective arrangement as claimed in claim 1, further comprising a solar cell arrangement for providing power to the at least one accessory and/or the portable electronic device.

5. The protective arrangement as claimed in claim 1, wherein the at least one accessory received by the cover is charged when the portable electronic device is charged.

6. The protective arrangement as claimed in claim 1, further comprising:
   a power input arrangement for receiving power; and
   a connector arrangement for providing power from the cover to the portable electronic device when installed within the cover.

7. The protective arrangement as claimed in claim 6, wherein the power input arrangement is operable to receive a mutually similar connector to that presented by the cover to the portable electronic device.

8. The protective arrangement as claimed in claim 1, wherein the at least one accessory comprises a wireless interface for communicating with the cover and/or the portable electronic device when detached from the cover.

9. The protective arrangement as claimed in claim 1, wherein the at least one accessory comprises a user interface which permits a user to control a function of the portable electronic device.

10. The protective arrangement as claimed in claim 1, wherein the cover is further adapted to receive the at least one accessory by at least one or more of: flexible clip-in mechanical coupling, magnetic coupling, micro-projection mutual engagement coupling, mechanical translation-type coupling, and pivotal coupling.

11. The protective arrangement as claimed in claim 1, wherein the at least one accessory is operable to be attached to a user's body.

12. The protective arrangement as claimed in claim 1, wherein the at least one accessory is received at a peripheral edge of the cover.

13. The protective arrangement as claimed in claim 1, wherein the portable electronic device comprises a mobile telephone.

14. The protective arrangement as claimed in claim 1, wherein the portable electronic device is installed therein.

15. A protective arrangement for use with a mobile telephone, comprising:
   a cover adapted at least partially to cover the mobile telephone when the mobile telephone is installed within the cover while allowing user access to the mobile telephone, the cover being further adapted to receive in a detachable manner one or more accessories for use with the mobile telephone,
   wherein the one or more accessories include one or more sensors for transducing one or more environmental parameters and providing one or more corresponding transduced signals to the mobile telephone and are operable to receive power from the cover.

16. A method of using a protective arrangement for use with a portable electronic device, the protective arrangement comprising a cover, the method comprising:
   (a) detaching at least one accessory from a respective position on the cover;
   (b) arranging for the at least one accessory at a respective location spatially remote from the cover; and
   (c) arranging for the at least one accessory to transduce one or more environmental parameters and communicate one or more corresponding signals to the cover and/or a mobile telephone or a portable electronic device.

17. A non-transitory computer readable medium bearing a software product, the software product is executable upon computing hardware of a mobile telephone or other portable electronic device for implementing a method of using a protective arrangement for use with a portable electronic device, the protective arrangement comprising a cover, the method comprising:
   (a) detaching at least one accessory from a respective position on the cover;
   (b) arranging for the at least one accessory at a respective location spatially remote from the cover; and (c) arranging for the at least one accessory to transduce one or more environmental parameters and communicate one or more corresponding signals to the cover and/or a mobile telephone or a portable electronic device.

18. A portable device comprising:

a portable electronic device;

a protective housing adapted to receive in a detachable manner at least one accessory which is able to receive power from the protective housing, wherein the protective housing covers the portable electronic device when the portable electronic device is installed in the protective housing while allowing a user an access to the portable electronic device, and wherein the at least one accessory transduces one or more environmental parameters and communicates one or more corresponding signals to the protective housing and/or the portable electronic device.

\* \* \* \* \*